(12) United States Patent
Hall

(10) Patent No.: US 7,080,809 B2
(45) Date of Patent: Jul. 25, 2006

(54) SPACE TRANSPORTATION SYSTEM

(76) Inventor: Allison Earl Hall, 16114 Seahorse Dr., Houston, TX (US)

( * ) Notice: Subject to any disclaimer, the term of this patent is extended or adjusted under 35 U.S.C. 154(b) by 18 days.

(21) Appl. No.: 10/414,556

(22) Filed: Apr. 15, 2003

(65) Prior Publication Data

US 2003/0230676 A1    Dec. 18, 2003

Related U.S. Application Data

(63) Continuation of application No. 09/953,930, filed on Sep. 17, 2001, now abandoned.

(51) Int. Cl.
*B64G 1/64* (2006.01)
(52) U.S. Cl. .................................. 244/172.2
(58) Field of Classification Search ............ 244/171.1, 244/171.2, 172.3, 172.2
See application file for complete search history.

(56) References Cited

U.S. PATENT DOCUMENTS

| | | | | |
|---|---|---|---|---|
| 3,132,827 A | * | 5/1964 | Duban et al. .................. 244/74 |
| 3,262,654 A | * | 7/1966 | Kaempen .................... 244/161 |
| 3,262,655 A | * | 7/1966 | Gillespie, Jr. ............. 244/173.1 |
| 3,304,724 A | * | 2/1967 | Blumrich et al. ............. 60/257 |
| 3,369,771 A | * | 2/1968 | Walley et al. ................ 244/162 |
| 3,570,789 A | * | 3/1971 | Rainey ...................... 244/90 R |
| D220,983 S | * | 6/1971 | Webb ........................ D12/334 |
| 3,672,606 A | * | 6/1972 | Walley ........................ 244/162 |
| 3,700,193 A | * | 10/1972 | Bradley ....................... 244/162 |
| 3,929,306 A | * | 12/1975 | Faget et al. ............... 244/159.3 |
| 3,955,784 A | * | 5/1976 | Salkeld ........................ 244/172 |
| 4,213,586 A | * | 7/1980 | Sengstock et al. ......... 244/173.3 |
| 4,451,017 A | * | 5/1984 | Marshall ................... 244/172.2 |
| 4,452,412 A | * | 6/1984 | von Pragenau .......... 244/171.3 |
| 4,557,444 A | * | 12/1985 | Jackson et al. ............. 244/172 |
| D291,555 S | * | 8/1987 | Rosenthal .................. D12/334 |
| 4,802,639 A | * | 2/1989 | Hardy et al. .................... 244/2 |
| 4,807,833 A | * | 2/1989 | Pori ....................... 244/158 R |
| 4,817,890 A | * | 4/1989 | Coffinberry ............. 244/135 R |
| 4,834,324 A | * | 5/1989 | Criswell .................. 244/158.9 |
| 4,884,770 A | * | 12/1989 | Martin .................... 244/159.3 |
| 5,031,857 A | * | 7/1991 | MacConochie et al. ..... 244/3.28 |
| 5,129,602 A | * | 7/1992 | Leonard ...................... 244/172 |
| 5,131,610 A | * | 7/1992 | Demange ................. 244/171.3 |
| 5,143,327 A | * | 9/1992 | Martin .................... 244/158 R |
| 5,143,328 A | * | 9/1992 | Leonard ................. 244/158 R |
| 5,217,187 A | * | 6/1993 | Criswell .................. 244/158 R |
| 5,227,579 A | * | 7/1993 | Gibson et al. .............. 102/378 |
| 5,295,642 A | * | 3/1994 | Palmer .......................... 244/2 |
| 5,507,451 A | * | 4/1996 | Karnish .......................... 244/2 |
| 6,123,295 A | * | 9/2000 | Wexler et al. ............... 244/160 |
| 6,193,187 B1 | * | 2/2001 | Scott et al. ..................... 244/2 |
| 6,360,994 B1 | * | 3/2002 | Hart et al. ............... 244/158 R |
| 6,422,514 B1 | * | 7/2002 | Clark et al. ............. 244/135 R |
| 6,446,905 B1 | * | 9/2002 | Campbell et al. ............... 244/2 |
| 6,450,452 B1 | * | 9/2002 | Spencer et al. ......... 244/158 R |

(Continued)

*Primary Examiner*—Teri Pham Luu
*Assistant Examiner*—Stephen A Holzen

(57) ABSTRACT

The invention, presents a new concept of spacecraft vehicle design and method of utilization in space flight operations. The system examines the major elements of launch, to orbit flight and return format. The system relies heavily on current space flight technology. Two spacecraft vehicles are utilized in conjunction to achieve Earth orbit. The vehicles are launched simultaneously in a joined configuration. Reaching approximately half distance to orbit, the vehicles separate with the booster vehicle returning to land and the transport vehicle continuing to Earth orbit. Terminating orbit space flight, the transport vehicle reenters the atmosphere returning to land. The details of spacecraft construction and space flight operations are complex and will not be discussed.

8 Claims, 5 Drawing Sheets

U.S. PATENT DOCUMENTS

| | | | |
|---|---|---|---|
| 6,554,228 B1 * | 4/2003 | Schoonmaker et al. | 244/158 R |
| 6,557,803 B1 * | 5/2003 | Carpenter et al. | 244/162 |
| 6,612,522 B1 * | 9/2003 | Aldrin et al. | 244/2 |
| 6,616,092 B1 * | 9/2003 | Barnes et al. | 244/2 |
| 6,642,490 B1 * | 11/2003 | Feher | 219/679 |
| 6,685,141 B1 * | 2/2004 | Penn | 244/162 |
| 6,695,261 B1 * | 2/2004 | Cleveland | 244/158 R |
| 6,712,319 B1 * | 3/2004 | Kiselev et al. | 244/172 |
| 2003/0052232 A1 * | 3/2003 | Hall | 244/172 |
| 2003/0098395 A1 * | 5/2003 | Casillas et al. | 244/172 |
| 2003/0102408 A1 * | 6/2003 | Casillas et al. | 244/172 |
| 2003/0173465 A1 * | 9/2003 | Herpay | 244/158 R |
| 2003/0230676 A1 * | 12/2003 | Hall | 244/172 |
| 2005/0045772 A1 * | 3/2005 | Martin | 244/158 R |

* cited by examiner

SPACE TRANSPORTATION SYSTEM

This application is a continuation of U.S. Pat. No. 09/953,930 filed Sep. 17, 2001 now abandoned

BACKGROUND OF THE INVENTION

The invention applies the physical action of aerodynamics, rocket propulsion, and atmospherical reentry conditions.

The aerodynamic principles utilized are consistent with current technology applied to spacecraft design. The spacecraft vehicle will normally contain a fuselage or capsulated structure, a wing to provide aerodynamic lift, and control surfaces for guidance. The fuselage may be designed to generate aerodynamic lift.

Rocket engines are generally classified as using either solid fuel or liquid fuel to provide propulsion. Current technology utilizes both types of engines to achieve Earth orbiting space flight.

The act of terminating space flight to return to the Earth surface is a process requiring relatively rapid deceleration. To solve this problem current technology utilizes a combination of methods, attitudes, and spacecraft integrity. This system is concerned with methods and the spacecraft vehicle integrity.

SUMMARY OF THE INVENTION

The objective of the invention is to provide specific information concerning spacecraft vehicle design and the utilization of these vehicles.

In accordance with features of the invention, a space flight launch and return system comprising:

An autonomous return booster (ARB) vehicle, containing two solid rocket engines and one liquid rocket engine.

An astronaut crew transport (ACT) vehicle, containing three liquid rocket engines.

Because of the complexity of spacecraft vehicles, the relative specifications will be limited to; aerodynamic shape and approximate size, rocket engine type and location in the vehicles, and flight operations format.

In launch configuration the ARB vehicle and the ACT vehicle are joined together utilizing current Technology as designated as 82 in FIG. 5. Ascending simultaneously, the vehicles separate approximately half distance to orbit altitude.

The ARB vehicle then descends utilizing autonomous guidance controls and lands like a conventional aircraft. The ACT vehicle continues on the orbit insertion trajectory. The ACT vehicle terminates orbiting space flight and reenters the Earth atmosphere utilizing current technology. Landing gear is designated as 81 in FIG. 2.

DETAILED DESCRIPTION OF THE INVENTION

Figure 1:
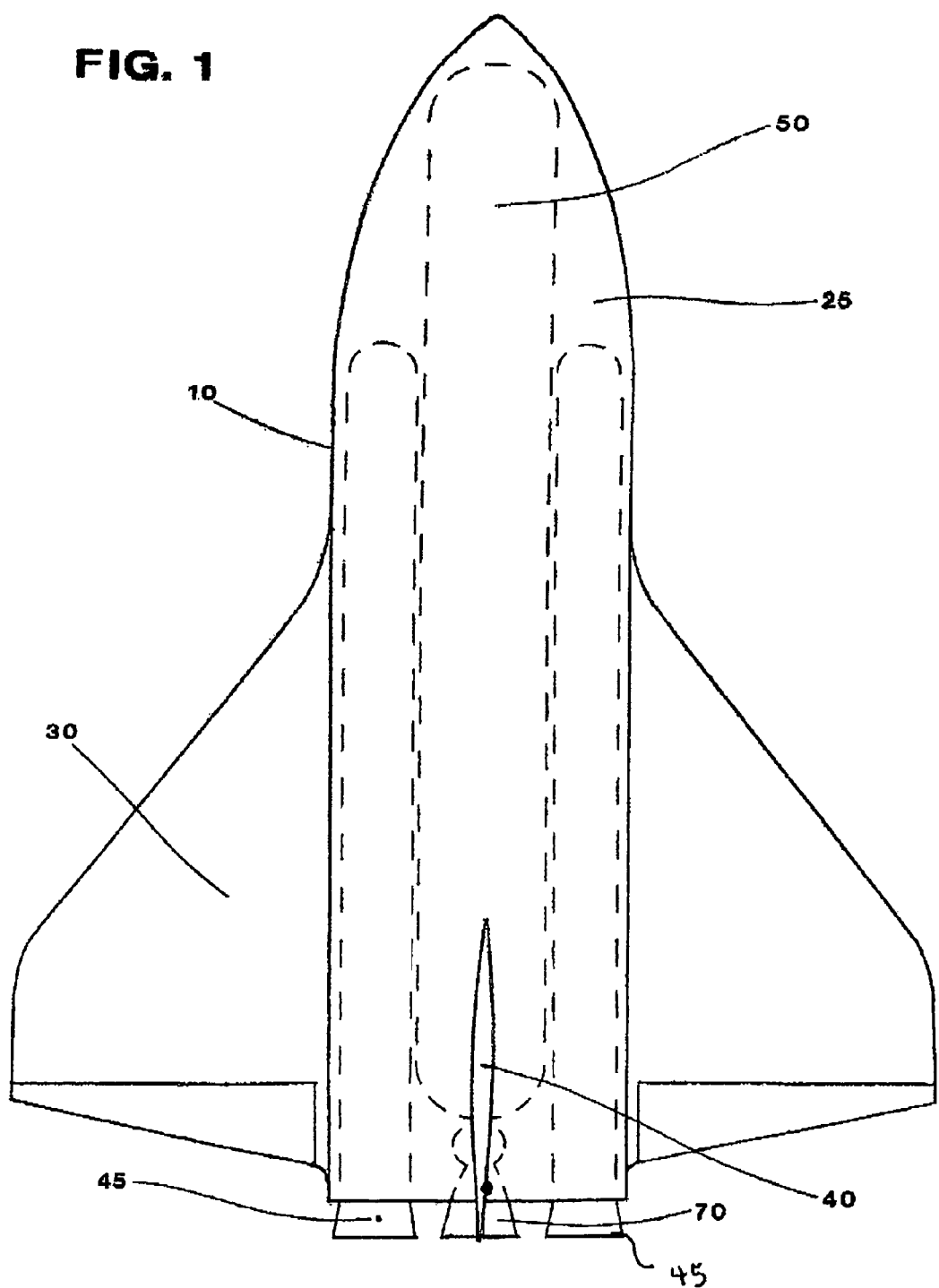
FIG. 1 The ARB vehicle as seen from the top.

The invention is comprised of two spacecraft vehicles working in conjunction to transport humans into Earth orbit. The transport system relies heavily on space flight technology developed over the last fifty years. Each vehicle will be described according to shape, size, engine configuration and role in the flight operation.

Autonomous Return Booster (ARB) Vehicle

The primary function of the ARB vehicle (10) i. to provide propulsion and fuel for the astronaut crew transport (ACT) vehicle (20). Somewhat similar to current technology, the ARB vehicle's (10) ascending flight is terminated before reaching orbit. Theoretical in nature, the ARB vehicle's (10) flight path would not include orbit reentry speed or temperature extremes.

The shape chosen to meet the requirements for such a vehicle is a modified delta wing rocket. The aerodynamically proven wing (30) is used with a single vertical (perpendicular to the wing) stabilizer (40) to lift and guide the rocket body. The rocket body (25), or fuselage, is relatively large in accordance with the function of containing the solid rocket engines (45) and the main fuel supply (50) for the liquid rocket engines. In addition, the ARB vehicle (10) contains one liquid rocket engine (70) for launch and return flight propulsion, the vehicle body U25) is modified cylinder with a semi-conical front section (80) or nose. The body (25) is flattened to the bottom (90) to accommodate the ACT vehicle (20) in the launch configuration and to generate lift in descending flight.

Figure 2:
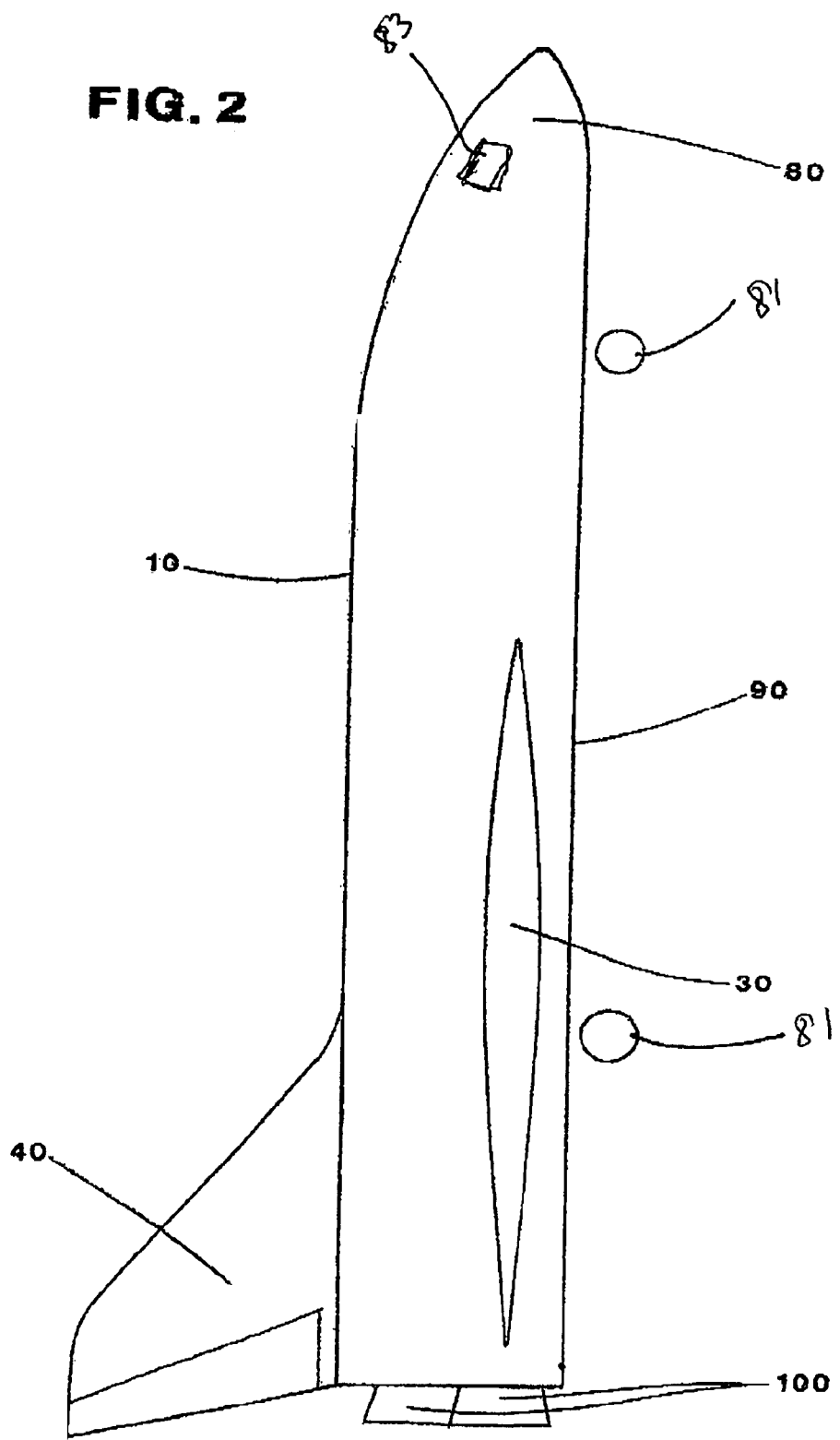
FIG. 2 The ARB vehicle as seen from the side.

(See FIGS. 1 and 2)

The ARB vehicle (10) contains two solid fuel rocket engines (45) located in alignment with the wing (30) and most outboard in the body (25). The liquid fuel engine (70) is located between and upward from the solid rocket engines (45) (as seen from level attitude). Nozzle locations (100) for the three engines (45, 70) are in alignment and extending from the rearward body (25). The liquid fuel tanks (50) are located forward from the liquid fuel engine (70) and between the solid fuel engines (45). All engines (45, 70) and engine related equipment remain with the vehicle during the course of the flight.

The guidance system utilized with the ARB vehicle (10) is autonomous computer consistent with current technology. Computer program software coordinate all flight operation functions. Theoretically, the ARB vehicle (10) is completely reusable. The ARB vehicle is approximately two times the size of the ACT vehicle (20) (by volume).

Astronaut Crew Transport (ACT) Vehicle

The primary function of the ACT vehicle (20) is to transport humans from Earth surface to Earth orbit and return to Earth Surface. The ACT vehicle (20) is utilized in conjunction with the ARB vehicle (10) to achieve this goal. The ACT vehicle's (20) ascending flight continues, after separating from the ARB vehicle (10), to Earth orbit. Terminating orbit space flight, the ACT vehicle (20) must reenter the Earth atmosphere and is subjected to temperature extremes.

The shape chosen to meet the requirements for such a vehicle is an integrated delta wing lifting body (120). The aerodynamic lifting body (120) transit the delta wing to form a shape with greater lifting properties than the wing alone. The lifting body (120) expanded surface creates greater resistance during reentry and improves the glide ratio. Stability is accomplished with twin semi-vertical fins (130) located on the outward edges of the wing (150). The spacecraft (20) is relatively small in accordance with the function of containing the astronaut crew (not shown) and the fuel supply (160) for the three liquid rocket engines (170, 180). The ACT vehicle (20) does not contain a large cargo bay.

Figure 3:
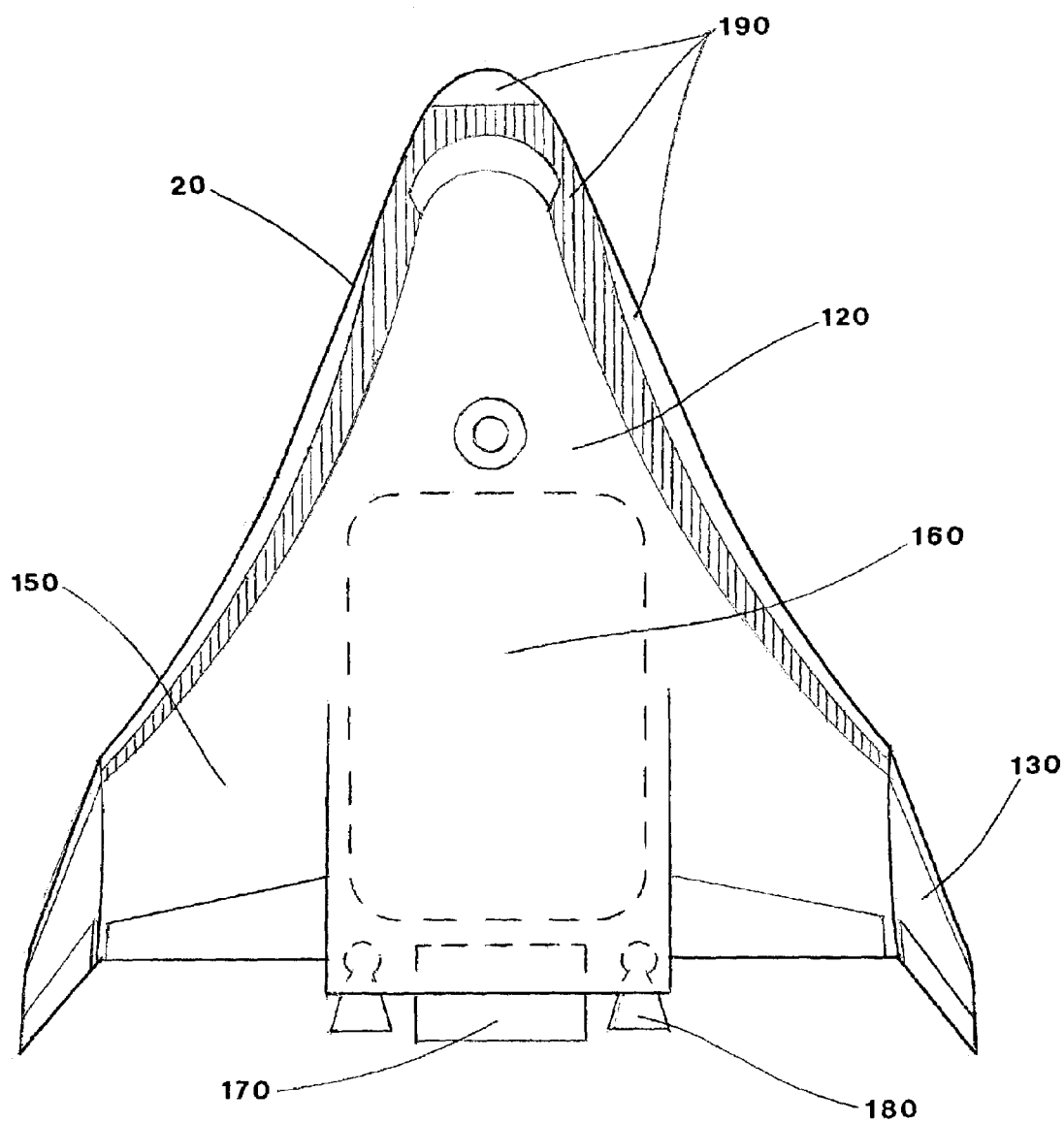
FIG. 3 The ACT vehicle as seen from the top.
Figure 4:
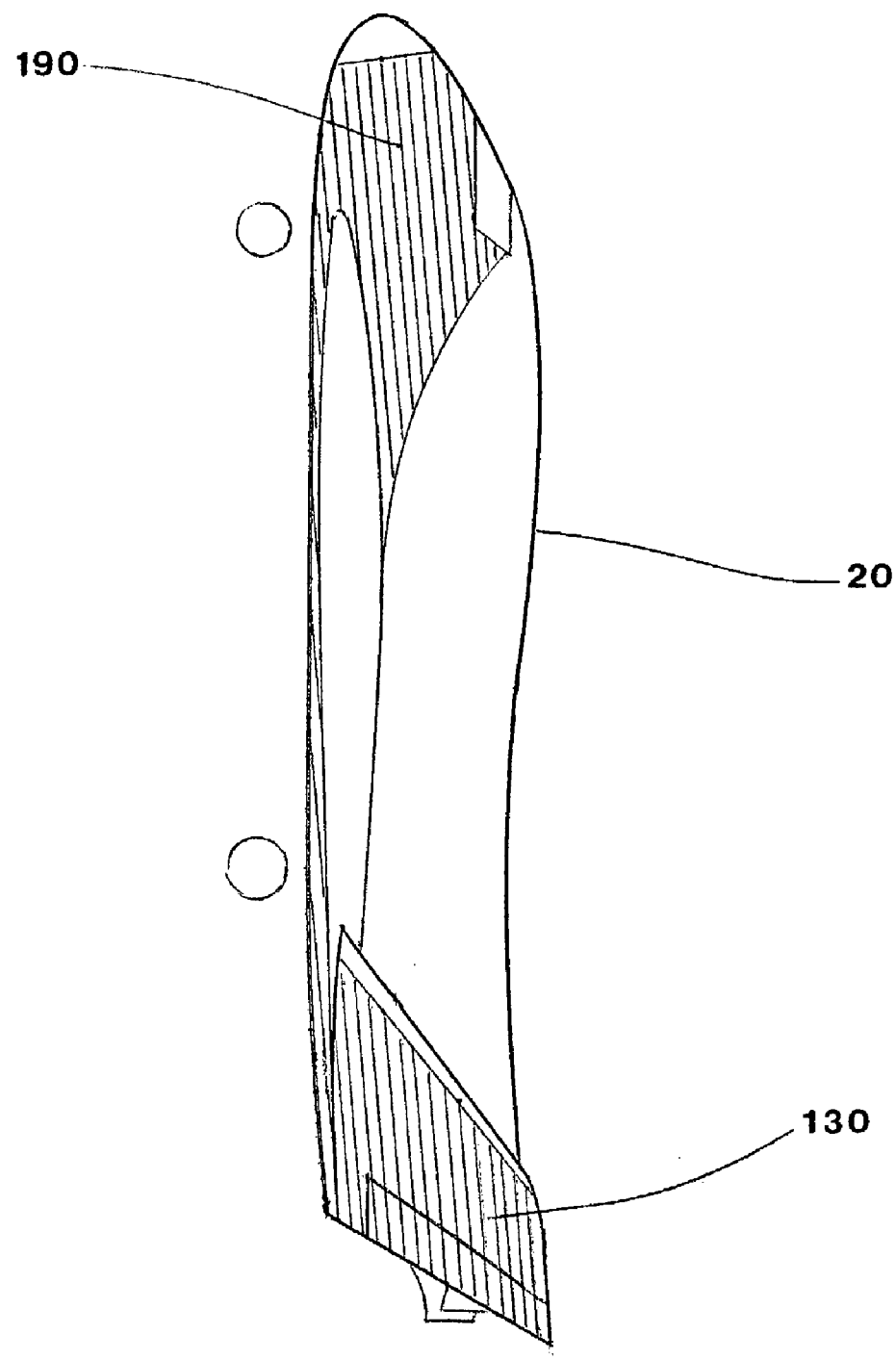
FIG. 4 The ACT vehicle as seen from the side.

(See FIGS. 3 and 4)

The ACT vehicle (20) engine configuration is one main engine (170) utilized for launch and reentry burn. Two smaller engines (180) are utilized for orbit maneuvering. The main engine (170) is an Aerospike liquid fuel type located in the center rearward body. The smaller engines (180) are conventional liquid fuel type located outward from the main engine (170). The fuel supply for the main engine is directed from the ARB vehicle (10) until the vehicles (10, 20) separate. A large portion of the ACT vehicle (20) body/wing (120/150) supplies the remaining fuel.

The guidance system utilized with the ACT vehicle (20) is computer control led consistent with current technology designated as 83 in FIG. 2. Computer program software control most flight operation functions with the exception of space orbit docking maneuvers and landing. The ACT vehicle (20) is completely reusable. The ACT vehicle (20) is approximately one half the size of the ARE vehicle (10) (by volume). The ACT vehicle (20) is equipped with a thermal protection system (190).

Spacecraft are normally built utilizing aluminum alloy metal, steel alloy metal, titanium metal and synthetic composite material. In concept, the ARB vehicle (10) would primarily utilize aluminum alloy metal. In concept, the ACT vehicle (20) would primarily utilize titanium metal. The technology required to produce spacecraft vehicles is so immense and specialized that no explanation is included.

In conclusion, the invention illustrates, with drawings, a space transportation system where the spacecraft vehicles (10, 20) are completely reusable. Theoretically, the cost of space flight operations could be reduced substantially. The ARB vehicle (10) and the ACT vehicle (20) work together to transport humans to Earth orbit. Notably, the ACT vehicle (20) is limited in capacity and designed for an astronaut crew.

Figure 5:
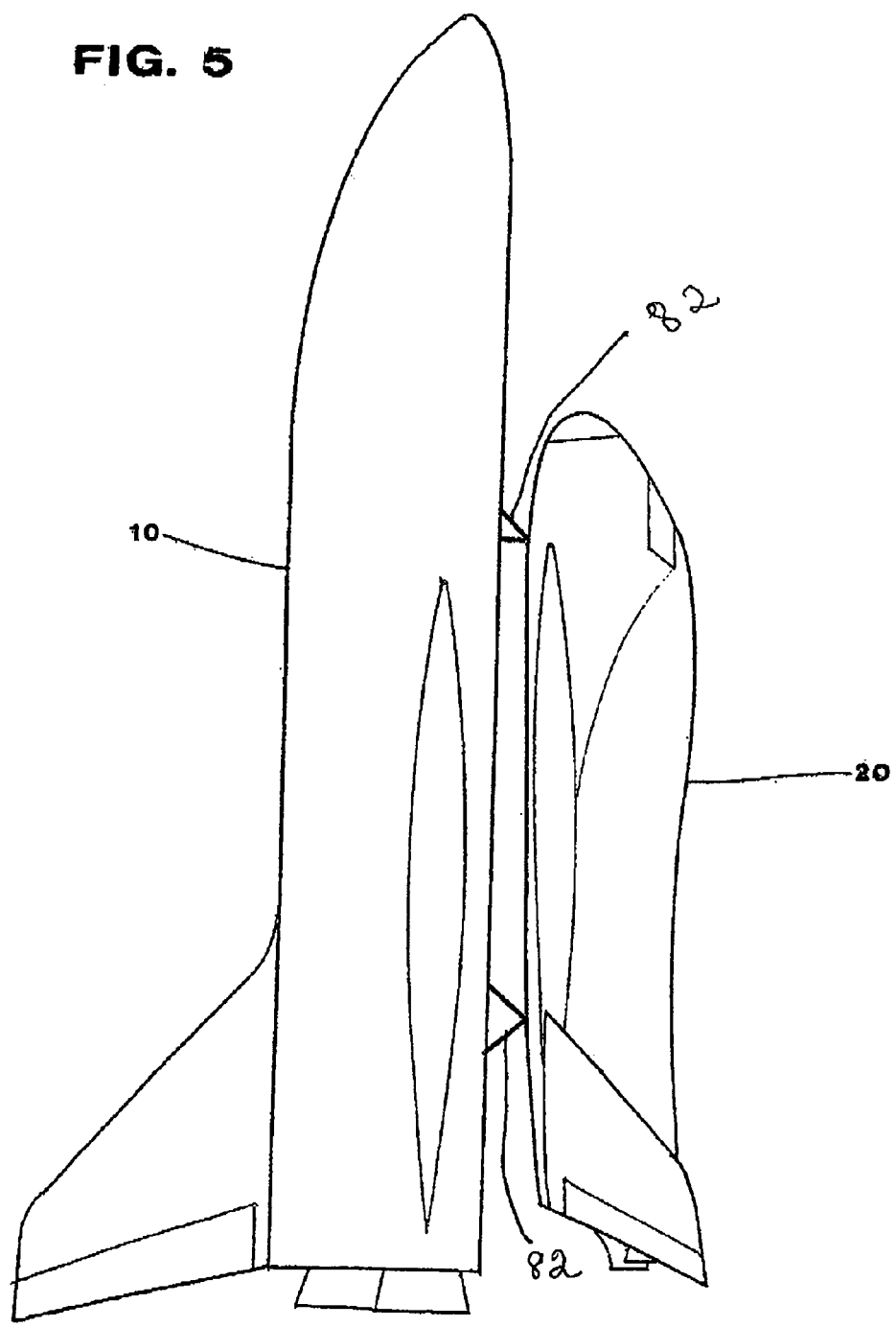
FIG. 5 The ARB vehicle and the ACT vehicle in launch configuration.

(See FIG. 5)

Both the ARB vehicle (10) and the ACT vehicle (20) are the product of extensive research concerning aerodynamic design. These airframe designs could also be utilized in lover atmosphere flight operations. Substitution of turbojet engines (not shown) for the rocket engines (45, 70, 170, 180) would transform the vehicles for conventional aircraft use.

What is claimed is:

1. A space transportation launch system comprising:
    a first vehicle and a second vehicle,
    the first vehicle and second vehicle each having a body defined by a top end, a lower end, a first side, an opposing second side, and a bottom surface, the first and second vehicle being releaseably connected in a vertical launch configuration wherein the bottom surface of each vehicle is joined facing each other;
    the body of the first vehicle containing at least one liquid rocket engine with a main fuel supply and a nozzle and at least one solid fuel rocket engine;
    the body of the first vehicle being larger than the body of the second vehicle;
    the at least one solid rocket engine being linearly aligned with the first side or the opposing second side and having a nozzle and a fuel tank, the solid rocket engine nozzle extend outward from the lower end of the body, the fuel tank extending linearly upward from the nozzle,
    the at least one liquid rocket engine being linearly aligned next to the at least one solid rocket engine, the liquid rocket engine nozzle extending outward from the lower end of the first vehicle body, the main fuel supply extending linearly upward from the liquid nozzle,
    the second vehicle being a trans-atmospheric lifting body orbiter wherein an integrated delta wing is formed on the lower end of the first side and the opposing second side of the body of the second vehicle to generate lift;
    and the first vehicle having means for separating from the second vehicle and landing.

2. The launch system of claim 1 further comprising a single vertical stabilizer perpendicularly and externally mounted to the lower end of the first body at an intermediate position on the body between the first side and the opposing second side.

3. The launch system of claim 1 wherein the bottom surface of the first vehicle is flattened to accommodate the bottom surface of the second vehicle when in the vertical launch configuration and to generate lift during descending flight.

4. The launch system of claim 1 wherein the first vehicle further comprises a delta wing externally mounted to the lower end of the first side and the opposing second side of the body.

5. The launch system of claim 1 wherein the body of the first vehicle is dimensioned to internally contain the at least one liquid rocket engine and the at least one solid rocket engine.

6. The launch system of claim 4 wherein the at least one solid rocket engine is in alignment with the delta wing and outboard within the body of the first vehicle.

7. The launch system of claim 4 wherein the first vehicle is unmanned and computer controlled.

8. The launch system of claim 1 wherein the second vehicle further comprises a semi-vertical fin positioned on the far outward edges of the integrated delta wing to generate lift during flight.

* * * * *